US011689113B2

(12) United States Patent
Tao et al.

(10) Patent No.: US 11,689,113 B2
(45) Date of Patent: Jun. 27, 2023

(54) CONTROL CIRCUIT OF FLYBACK CIRCUIT

(71) Applicant: Halo Microelectronics International, Campbell, CA (US)

(72) Inventors: Hai Tao, Sunnyvale, CA (US); Chih-Hsien Hsieh, Dacun Township (TW); Kai-Fang Wei, San Jose, CA (US); Zhibo Tao, San Jose, CA (US)

(73) Assignee: Halo Microelectronics International, Campbell, CA (US)

( * ) Notice: Subject to any disclaimer, the term of this patent is extended or adjusted under 35 U.S.C. 154(b) by 152 days.

(21) Appl. No.: 17/205,596

(22) Filed: Mar. 18, 2021

(65) Prior Publication Data
US 2022/0302849 A1 Sep. 22, 2022

(51) Int. Cl.
*H02M 3/335* (2006.01)
*H02J 7/00* (2006.01)
*H02M 1/00* (2006.01)

(52) U.S. Cl.
CPC ......... *H02M 3/33592* (2013.01); *H02J 7/007* (2013.01); *H02M 1/0019* (2021.05); *H02M 3/33523* (2013.01); *H02J 2207/20* (2020.01)

(58) Field of Classification Search
CPC ......... H02M 3/33592; H02M 3/33523; H02M 1/0019; H02J 7/007; H02J 2207/20; Y02B 70/10
See application file for complete search history.

(56) References Cited

U.S. PATENT DOCUMENTS

| | | | | | |
|---|---|---|---|---|---|
| 2009/0279326 | A1* | 11/2009 | Hyuugaji | .......... | H02M 3/33592 363/21.06 |
| 2015/0103567 | A1* | 4/2015 | Wang | ................ | H02M 3/33592 363/21.13 |
| 2016/0079878 | A1* | 3/2016 | Lin | .................... | H02M 3/33592 363/21.14 |

FOREIGN PATENT DOCUMENTS

CN 206894507 U * 1/2018

* cited by examiner

*Primary Examiner* — Kyle J Moody
*Assistant Examiner* — Jye-June Lee
(74) *Attorney, Agent, or Firm* — Li Li; AP3 Law Firm PLLC

(57) ABSTRACT

A control circuit is configured to control a flyback circuit comprising a primary-side switch, a secondary-side rectifier and a transformer. The control circuit comprises a feedback control circuit configured to generate a secondary-side control signal based on a current ripple signal of the transformer, and at least one of a direct-current component of an output voltage signal and a direct-current component of an output current signal of a secondary side of the flyback circuit, wherein the secondary-side control signal is configured to control a turn-off of the secondary-side rectifier, an isolated transmission circuit coupled to the feedback control circuit and configured to generate a first primary-side control signal based on the secondary-side control signal, and a primary control circuit coupled to the isolated transmission circuit and configured to control a turn-on of the primary-side switch in response to receiving the first primary-side control signal.

20 Claims, 13 Drawing Sheets

CONTROL CIRCUIT OF FLYBACK CIRCUIT

TECHNICAL FIELD

The present disclosure relates to the technical field of electronics and circuits, and in particular, relates to a control circuit, a flyback circuit and a charger.

BACKGROUND

A flyback circuit is a power source circuit capable of converting an alternating current into a direct current, and boosting/bucking the voltage. Due to high efficiency, small dimensions and light weight, the flyback circuit is widely used in the charging field. For example, a charger including the flyback circuit is capable of obtaining direct currents upon AC/DC conversion and charging various electronic devices or rechargeable batteries.

When the flyback circuit is used in the charger, for conveniently regulating output power, a feedback circuit is conventionally added to sense variations of an output voltage or an output current, and the output power is regulated based on a signal indicative of the variations.

FIG. 1 is a schematic diagram of a flyback circuit. As illustrated in FIG. 1, the flyback circuit includes a primary controller, a secondary controller, a transformer T, a primary-side switch Q1, a secondary-side switch Q2, an opto-coupler OC, and an output capacitor Co.

The primary controller is configured to control the turn-on or turn-off of the primary-side switch Q1 to achieve regulation of the output voltage. The secondary controller is configured to control the turn-on or turn-off of the secondary-side rectifier Q2 to achieve synchronous rectification. When the primary-side switch Q1 is turned on and the secondary-side rectifier Q2 is turned off, a primary winding Np of the transformer T is directly coupled to an input power source VIN. As a current of the primary winding Np progressively increases, and the primary winding Np stores energy. At the same time, the output capacitor Co supplies power to a load based on previously stored electric energy. When the primary-side switch Q1 is turned off and the secondary-side rectifier Q2 is turned on, the energy stored in the primary winding Np starts to be transmitted to a secondary winding Ns of the transformer T, and the current flows through the secondary winding Ns and charges the output capacitor Co to store the electric energy.

The opto-coupler OC, as a feedback circuit, senses an output signal of the secondary side such as an output voltage. The opto-coupler OC generates a signal, which functions as an auxiliary control signal of the primary side. This auxiliary control signal is employed to assist the primary controller to control the primary-side switch Q1 such that a desired output voltage level or an output current level can be obtained on the secondary side.

However, the auxiliary control signal generated by the opto-coupler OC does not reflect the actual output voltage or output current, that is, a load voltage or the load current that is varying in real time is not directly captured from the load. Therefore, during the feedback process, a delay is inevitable. As such, the primary side fails to quickly and timely respond to the constant-varying output voltage or output current on the secondary side. Due to this hysteresis, the primary-side controller fails to maintain synchronization with the output voltage or the output current to control in real time the primary-side switch Q1. Consequently, the present output voltage or output current applied to the load is different from the actual voltage or current desired by the load. As a result, the output voltage or the output current is instable. In addition, since the control of the primary-side switch Q1 by the primary controller is independent of the control of the secondary-side rectifier Q2 by the secondary controller, in a continuous conduction mode (CCM), due to the hysteresis, the primary-side switch Q1 has been turned on before the secondary-side rectifier Q2 is turned off. That is, it is likely that the primary-side switch Q1 and the secondary-side rectifier Q2 are concurrently in a turn-on state. As such, the primary-side switch Q1 withstands an extremely great transient input inrush current, and the continuous transient input inrush current may cause stress and introduce reliability issues of the circuit elements such as the primary-side switch Q1, and these circuit elements may be burnt out in a severe case.

Therefore, in the related art, in the flyback circuit capable of regulating the output power based on feedback, the primary side fails to timely respond to the output variations of the secondary side or the primary-side switch and the secondary-side rectifier are simultaneously turned on. Therefore, the flyback circuit in the related art needs improvements.

SUMMARY

These and other problems are generally solved or circumvented, and technical advantages are generally achieved, by preferred embodiments of the present disclosure which provide a control circuit, a flyback circuit and a charger.

In accordance with an embodiment, a control circuit is configured to control a flyback circuit comprising a primary-side switch, a secondary-side rectifier and a transformer. The control circuit comprises a feedback control circuit configured to generate a secondary-side control signal based on a current ripple signal of the transformer, and at least one of a direct-current component of an output voltage signal and a direct-current component of an output current signal of a secondary side of the flyback circuit, wherein the secondary-side control signal is configured to control a turn-off of the secondary-side rectifier, an isolated transmission circuit coupled to the feedback control circuit and configured to generate a first primary-side control signal based on the secondary-side control signal, and a primary control circuit coupled to the isolated transmission circuit and configured to control a turn-on of the primary-side switch in response to receiving the first primary-side control signal.

In accordance with another embodiment, a flyback circuit comprises a transformer, a primary-side switch connected to a primary winding of the transformer, a secondary-side rectifier connected to a secondary winding of the transformer, and a control circuit comprising a feedback control circuit configured to generate a secondary-side control signal based on a current ripple signal of the transformer, and at least one of a direct-current component of an output voltage signal and a direct-current component of an output current signal of a secondary side of the flyback circuit, wherein the secondary-side control signal is configured to control a turn-off of the secondary-side rectifier, an isolated transmission circuit coupled to the feedback control circuit and configured to generate a first primary-side control signal based on the secondary-side control signal, and a primary control circuit coupled to the isolated transmission circuit and configured to control a turn-on of the primary-side switch in response to receiving the first primary-side control signal.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a control circuit, a flyback circuit, and a charger. The invention may also be applied, however, to a variety of power conversion systems. Hereinafter, various embodiments will be explained in detail with reference to the accompanying drawings.

Figure 1:
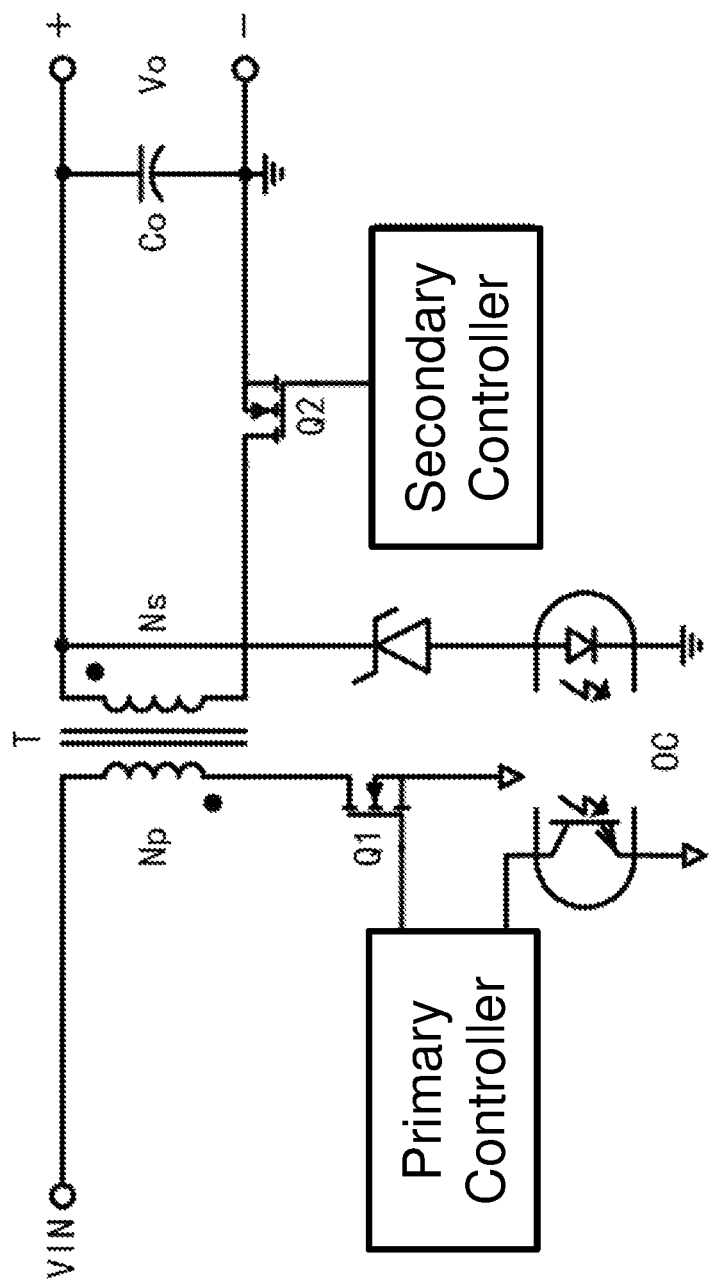
FIG. 1 is a schematic diagram of a flyback circuit.
Figure 2:
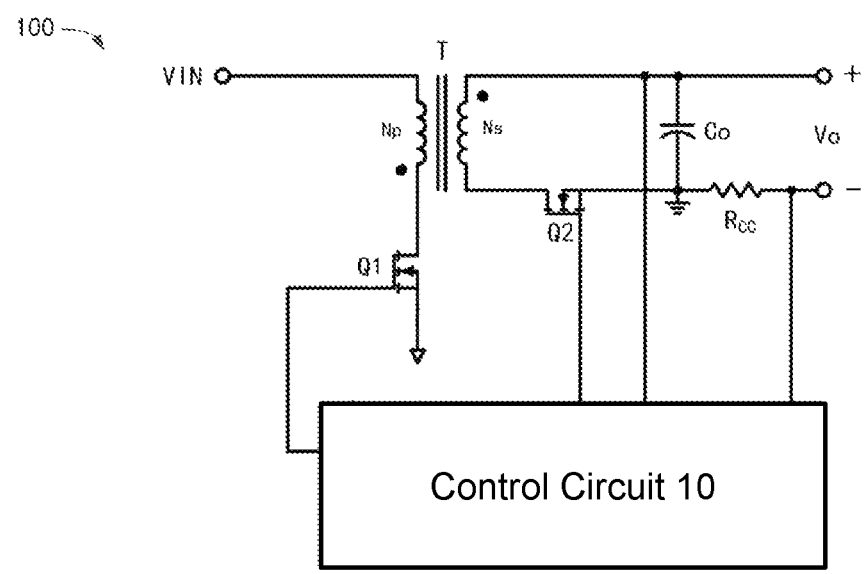
FIG. 2 is a schematic diagram of a flyback circuit according to an embodiment of the present disclosure.

An embodiment of the present disclosure provides a flyback circuit. As illustrated in FIG. 2, a flyback circuit 100 includes a control circuit 10, a primary-side switch Q1, a secondary-side rectifier Q2, a transformer T configured to isolate a current, and an output capacitor Co. The flyback circuit 100 receives an input voltage VIN and outputs a regulated output voltage Vo fed into a load.

The control circuit 10 is connected to the primary-side switch Q1 and the secondary-side rectifier Q2. The control circuit is employed to control the primary-side switch Q1 and the secondary-side rectifier Q2. One terminal of a primary winding Np of the transformer T is configured to be coupled to an input power source VIN, and the other terminal of the primary winding Np of the transformer T is grounded via the primary-side switch Q1. The output capacitor Co is connected in parallel between a positive terminal of the output voltage and a negative terminal of the output voltage. One terminal of the secondary winding Ns of the transformer T is connected to one terminal of the output capacitor Co via the secondary-side rectifier Q2, and the other terminal of the secondary winding Ns of the transformer T is connected to the other terminal of the output capacitor Co.

Specifically, as illustrated in FIG. 2, the primary-side switch Q1 is an NMOS transistor (in practice, Q1 may also be any other type of transistors). A drain of the NMOS transistor is connected to one terminal of the primary winding Np of the transformer T, and a source of the NMOS transistor is grounded. A gate of the NMOS transistor is connected to the control circuit 10. The secondary-side rectifier Q2 is an NMOS transistor (in practice, Q2 may also be any other type of transistors). A drain of the NMOS transistor is connected to one terminal of the secondary winding Ns of the transformer T, and a source of the NMOS transistor is grounded. A gate of the NMOS transistor is connected to the control circuit 10.

The control circuit 10 acquires in real time an output signal on the secondary side, and generates a secondary-side control signal based on the output signal. The secondary-side control signal functions as a turn-off control signal of the secondary-side rectifier Q2, and meanwhile functions as a turn-on control signal of the primary-side switch Q1. By such a feedback control mechanism, an output voltage or an output current may be adaptively adjusted in real time to acquire an anticipated and stable output voltage or output current. In an application scenario of switching between different magnitudes of the output voltage or the output current, an accurate output voltage or output current can be acquired.

In addition, during the transmission of the secondary-side control signal, the secondary-side rectifier Q2 is first controlled to be turned off, and then the primary-side switch Q1 is controlled to be turned on. Therefore, even in a continuous conduction mode (CCM), the secondary-side rectifier Q2 and the primary-side switch Q1 may not be turned on simultaneously. Further, the turn-on of the primary-side switch Q1 is directly controlled by the secondary-side control signal, and the secondary-side control signal controls a turn-on or turn-off switching frequency of the primary-side switch Q1. Therefore, the primary side is capable of quickly and timely responding to variations of the output voltage, the output current or the like, or output exceptions, such that the entire flyback circuit operates more reliably and stably.

Figure 3:
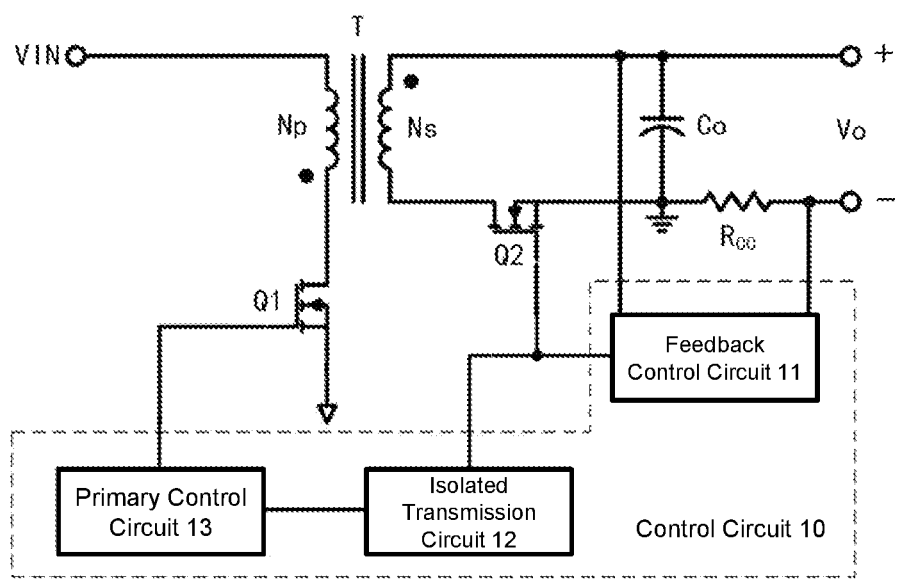
FIG. 3 is a schematic diagram of the control circuit in FIG. 2.

Specifically, as illustrated in FIG. 3, the control circuit 10 includes a feedback control circuit 11, an isolated transmission circuit 12, and a primary control circuit 13.

The feedback control circuit 11 generates the secondary-side control signal based on at least one of a direct-current component of an output voltage signal and a direct-current component of an output current signal of the secondary side of the flyback circuit 100, and a current ripple signal of the transformer. The secondary-side control signal may function as the turn-off control signal of the secondary-side rectifier Q2.

Under one circumstance, when the direct-current component of the output voltage signal and the current ripple signal of the transformer T satisfy a predetermined condition, the feedback control circuit 11 outputs the turn-off control signal to control the secondary-side rectifier Q2 to be turned off. On the other hand, when the direct-current component of the output voltage signal and the current ripple signal of the transformer T do not satisfy the predetermined condition, the feedback control circuit 11 does not output the turn-off control signal.

Under another circumstance, when the direct-current component of the output current signal and the current ripple signal of the transformer T satisfy a predetermined condition, the feedback control circuit 11 outputs the turn-off control signal to control the secondary-side rectifier Q2 to be turned off. On the other hand, when the direct-current component of the output current signal and the current ripple signal of the transformer T do not satisfy the predetermined condition, the feedback control circuit 11 does not output the turn-off control signal.

The secondary-side control signal has a first modality and a second modality. The first modality and the second modality may be considered as two different level signals such as a high level signal and a low level signal. The turn-off control signal may be a secondary-side control signal in the first modality (e.g., the high level signal), or may be a secondary-side control signal in the second modality (e.g., the low level signal). In this embodiment, the secondary-side control signal in the first modality is used as the turn-off control signal of the secondary-side rectifier Q2.

The isolated transmission circuit 12 is connected to the feedback control circuit 11, and generates a first primary-side control signal based on the secondary-side control signal. The isolated transmission circuit 12 is configured to timely transmit the secondary-side control signal from the secondary side to the primary side, and form the first primary-side control signal. A waveform of the first primary-side control signal varies with a waveform of the secondary-side control signal. A transmission delay is present between these two control signals. For example, when the secondary-side control signal changes from the first modality to the second modality, after the transmission delay, the first primary-side control signal changes from the first modality to the second modality. The first primary-side control signals in the first modality and the second modality may also be considered as two different level signals such as a high level signal and a low level signal.

The primary control circuit 13 is connected to the isolated transmission circuit 12, and controls the primary-side switch Q1 to be turned on in response to receiving the first primary-side control signal in the first modality from the isolated transmission circuit 12. For example, when the first primary-side control signal in the first modality is a high level signal, the primary control circuit 13 controls the primary-side switch Q1 to be turned on based on the high level signal.

Figure 4:
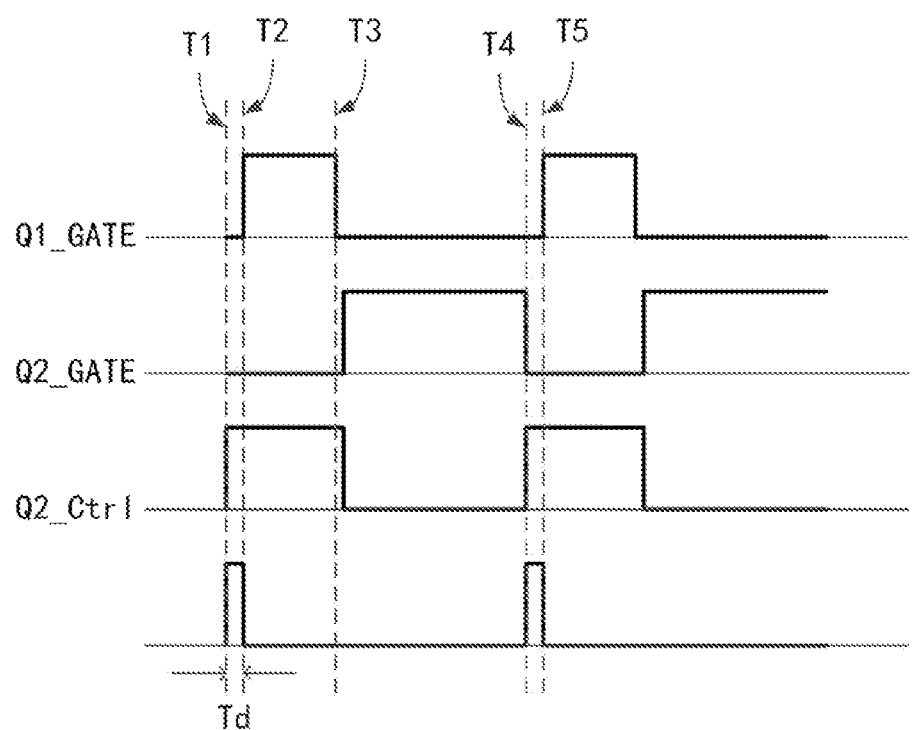
FIG. 4 illustrates various operating waveforms of the control circuit in FIG. 3.

As illustrated in FIG. 4, at a first time instant T1, the secondary-side control signal Q2 Ctrl changes from a low level signal to a high level signal. The secondary-side rectifier Q2 is immediately turned off. After a transmission delay Td, at a second time instant T2, the first primary-side control signal also changes from a low level signal to a high level signal. The primary-side switch Q1 is immediately turned on. Since the primary-side switch Q1 is controlled to be turned on after the secondary-side rectifier Q2 is controlled to be turned off, even in the CCM, the primary-side switch Q1 and the secondary-side rectifier Q2 may not be turned on simultaneously.

In addition, the feedback control circuit 11 generates the secondary-side control signal in response to variations of the output voltage or the output current on the secondary side. The secondary-side control signal is transiently responsive to the variations of the output voltage or the output current, and the first primary-side control signal is also responsive to the variations of the secondary-side control signal. Therefore, the first primary-side control signal is considered as a signal tracking in real time the variations of the output voltage or the output current, thereby achieving switching between the turn-on and the turn-off of the primary-side switch Q1.

Figure 5:
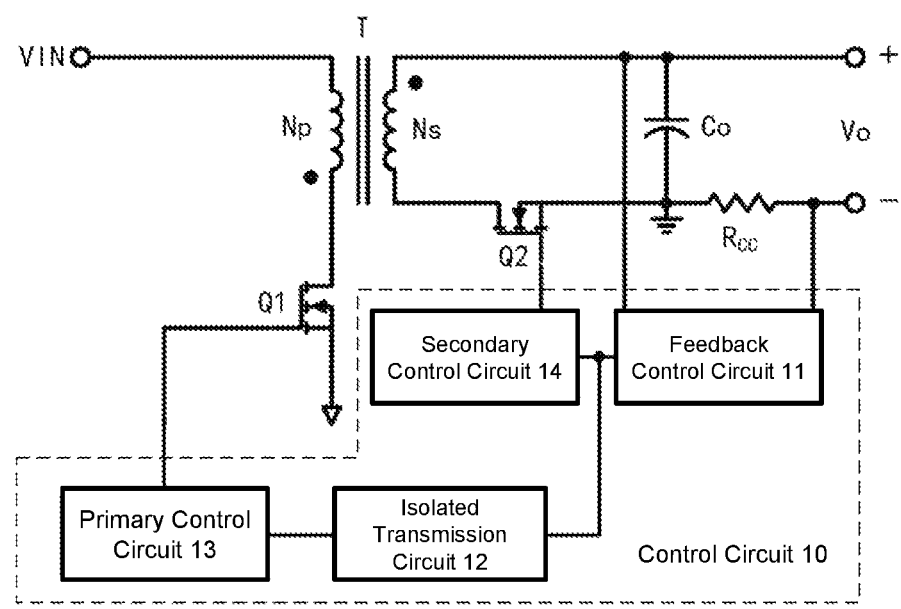
FIG. 5 is a schematic diagram of another control circuit according to an embodiment of the present disclosure.

As illustrated in FIG. 5, the flyback circuit 100 further includes a secondary control circuit 14. The secondary control circuit 14 is connected to the feedback control circuit 11 and the secondary-side rectifier Q2. The secondary control circuit 14 controls the secondary-side rectifier Q2 to be turned off in response to receiving the secondary-side control signal (e.g., a high level signal) in the first modality from the feedback control circuit 11.

Figure 6:
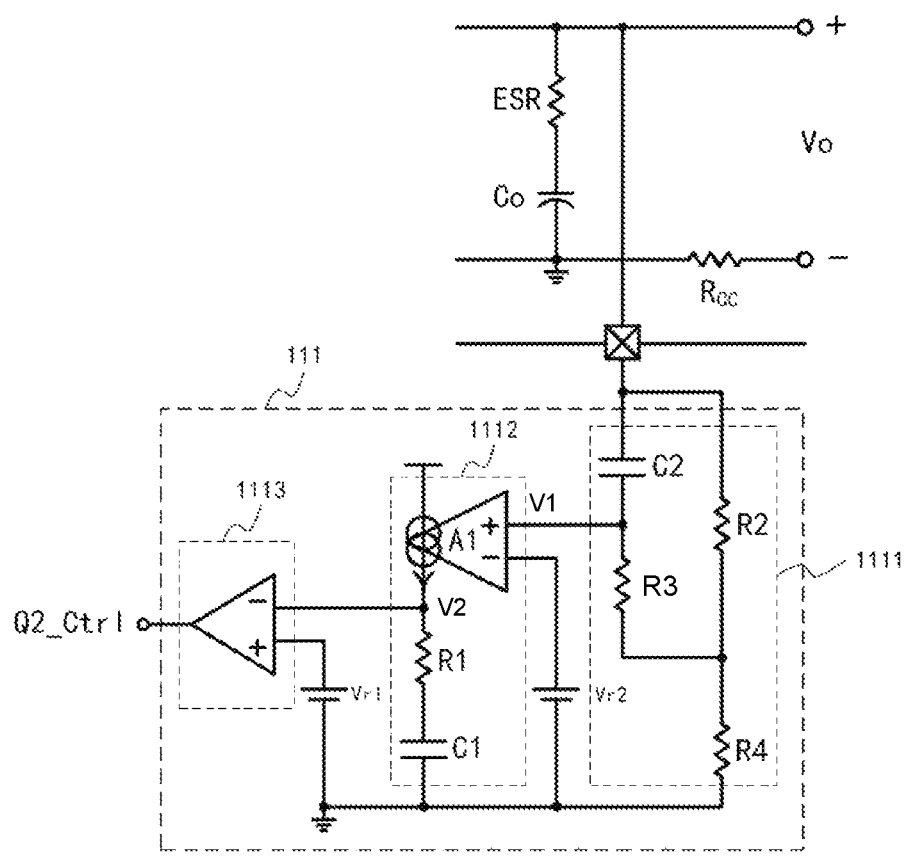
FIG. 6 is a schematic diagram of the feedback control circuit in FIG. 5.

In the process of generating the secondary-side control signal by the feedback control circuit 11 based on the direct-current component of the output voltage signal and the current ripple signal of the transformer T, as illustrated in FIG. 6, the secondary-side control signal is generated by a first feedback control circuit 111 based on the direct-current component of the output voltage signal and the current ripple signal of the transformer T.

The first feedback control circuit 111 is employed to control output ripples so as to reduce direct-current errors.

Specifically, the first feedback control circuit 111 includes a first pre-conditioning circuit 1111, a first compensation circuit 1112, and a comparator 1113.

The first pre-conditioning circuit 1111 is configured to acquire the direct-current component and the current ripple signal of the transformer T, and the first compensation circuit 1112 and the comparator 1113 are configured to process these signals to acquire the secondary-side control signal in a pulse form.

The first compensation circuit 1112 includes a first operational amplifier A1, a first resistor R1, and a first capacitor C1. The first pre-conditioning circuit 1111 includes a second resistor R2, a third resistor R3, a fourth resistor R4, and a second capacitor C2.

One terminal of the second resistor R2 and one terminal of the second capacitor C2 are both connected to the positive terminal Vo+ of the output voltage. The other terminal of the second capacitor C2 and one terminal of the third resistor R3 are both connected to a non-inverting input terminal of the first operational amplifier A1. The other terminal of the third resistor R3, the other terminal of the second resistor R2, and one terminal of the fourth resistor R4 are connected together. The other terminal of the fourth resistor R4 is grounded.

It should be noted that the first pre-conditioning circuit 1111 may be constructed in other forms, which is not limited to the construction made by the second resistor R2, the third resistor R3, the fourth resistor R4, and the second capacitor C2. However, the first pre-conditioning circuit 1111 may be constructed in any form as long as the first pre-conditioning circuit 1111 is capable of acquiring the direct-current component of the output voltage signal and the current ripple signal of the transformer T and feeding the signals to the first compensation circuit 1112. In addition, the first compensation circuit 1112 and the comparator 1113 may also be constructed in other forms, as long as the first compensation circuit 1112 and the comparator 1113 are capable of acquiring the secondary-side control signal in the pulse form based on the direct-current component of the output voltage signal and the current ripple signal of the transformer T.

An inverting input terminal of the first operational amplifier A1 is applied with a reference voltage Vr2. An output terminal of the first operational amplifier A1 is connected to a first input terminal (for example, an inverting input terminal) of the comparator 1113. The first resistor R1 and the first capacitor C1 are connected in series to form a branch. One terminal of the branch is connected to an output terminal of the first operational amplifier A1, and the other terminal of the branch is grounded. A second input terminal (for example, a non-inverting input terminal) of the comparator 1113 is applied with a reference voltage Vr1, and an output terminal of the comparator 1113 is connected to the secondary-side rectifier Q2 and the isolated transmission circuit 12.

In a constant voltage regulation mode, the output voltage signal is divided by the second resistor R2 and the fourth resistor R4. A feedforward effect formed by the second capacitor C2 and the third resistor R3 is applied to the output voltage signal. The direct-current component of the output voltage signal and the current ripple signal of the transformer T are acquired at a common node of the second capacitor C2 and the third resistor R3, and then applied to the non-inverting input terminal of the first operational amplifier A1.

The first operational amplifier A1, the first resistor R1, and the first capacitor C1 form a second-order compensation circuit structure. The first capacitor C1 serves as an integrator to reduce direct-current errors. The first resistor R1 is capable of amplifying an amplitude of the current ripple signal of the transformer T. The amplified amplitude helps the comparator 1113 generate a digital signal. In addition, controlling the ripple may eliminate low-frequency pole formed by the output capacitor Co in the frequency response. Therefore, the frequency response is relatively quick, and the second-order compensation circuit structure may be designed in a high-frequency range.

In this way, the secondary-side control signal generated by the comparator 1113 is capable of timely responding to the variations of the output voltage, and meanwhile, a control signal of each switching cycle is acquired from the secondary-side control signal based on the current ripple signal of the transformer T.

This embodiment is described in detail hereinafter with reference to FIG. 7. It should be noted that for ease of description, the transmission delay of the isolated transmission circuit 12 is ignored herein.

Figure 7:
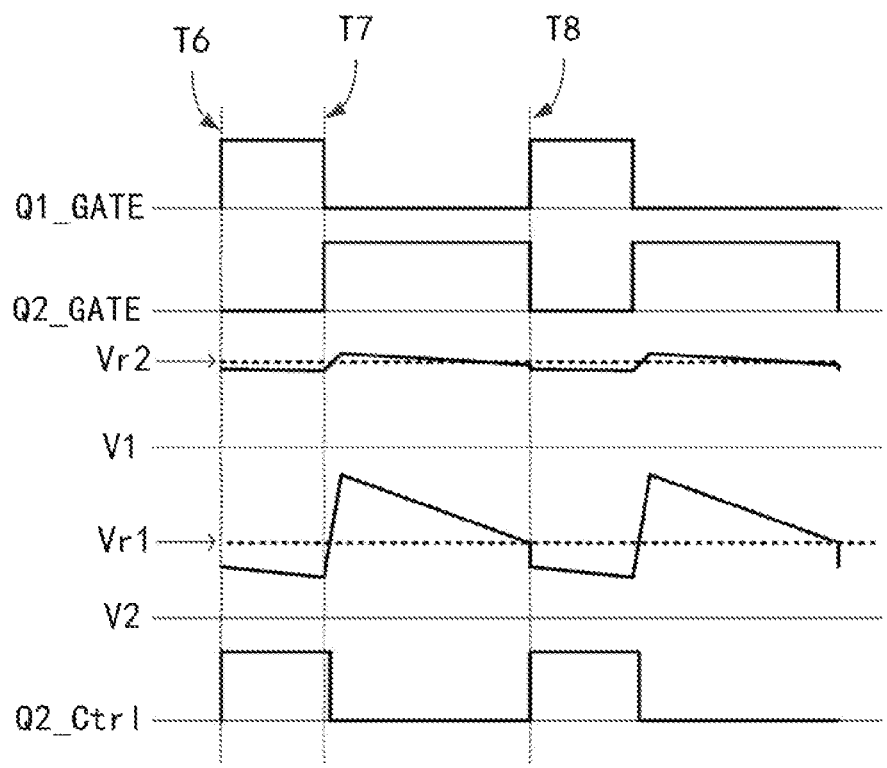
FIG. 7 illustrates various operating waveforms of the feedback control circuit in FIG. 6.

As illustrated in FIG. 7, at a sixth time instant T6, a signal V2 output by the first operational amplifier A1 is responsive to a signal (hereinafter referred to as a voltage signal V1) acquired by superimposing the direct-current component of the output voltage onto the current ripple signal of the transformer T. When the signal V2 output by the first operational amplifier A1 is less than the reference voltage Vr1, the comparator 1113 outputs a high level signal. The secondary-side controller takes the high level signal as the turn-off control signal to timely turn off the secondary-side rectifier Q2, and meanwhile the high level signal serves as the turn-on control signal of the primary-side switch Q1 to timely turn on the primary-side switch Q1. The same principle is applicable to the operation at the eighth time instant T8, which is not described herein any further.

Figure 8:
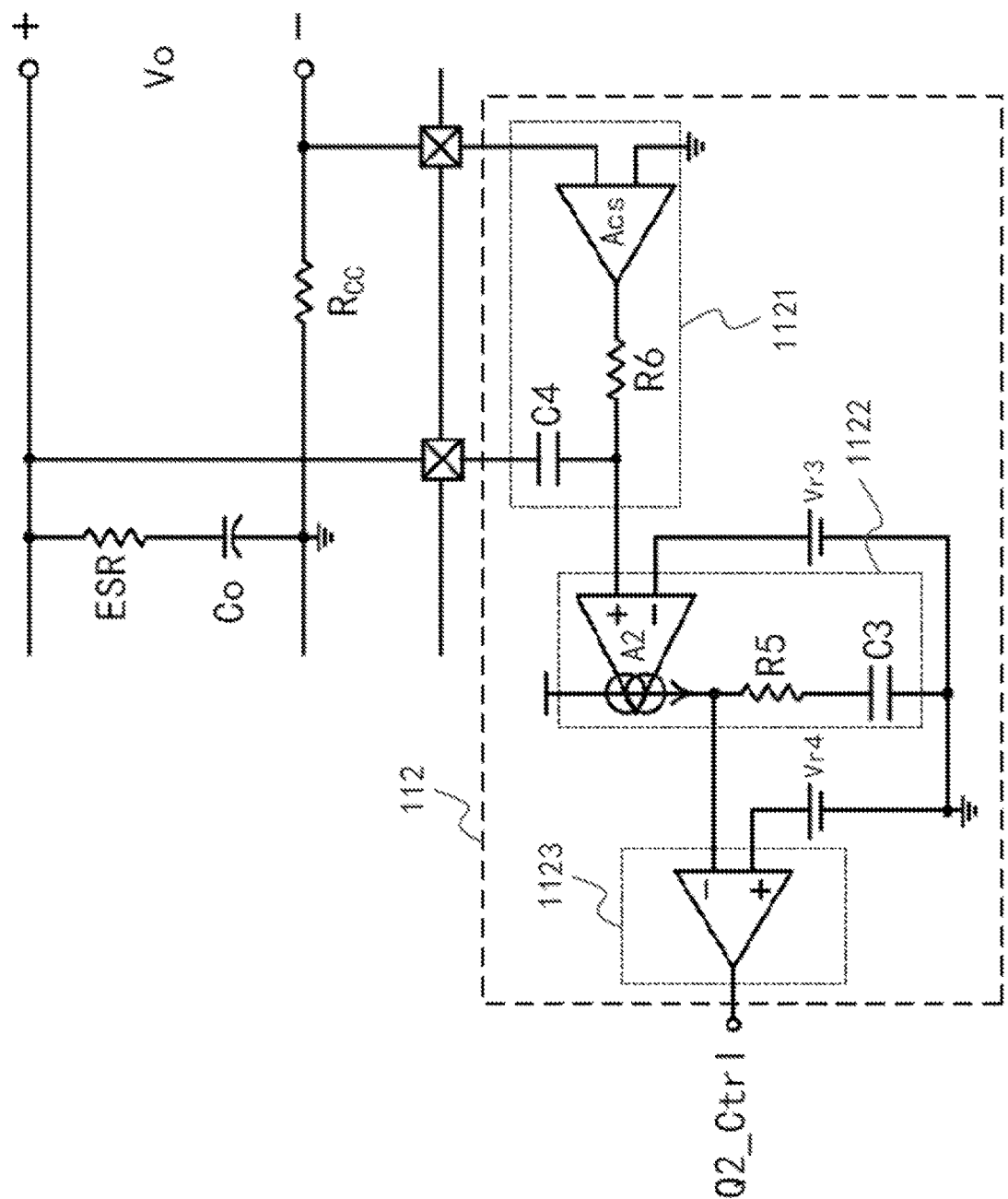
FIG. 8 is a schematic diagram of another feedback control circuit in FIG. 5.

In the process of generating the secondary-side control signal by the feedback control circuit 11 based on the direct-current component of the output current signal and the current ripple signal of the transformer T, as illustrated in FIG. 8, the secondary-side control signal is generated by a second feedback control circuit 112 based on the direct-current component of the output voltage signal and the current ripple signal of the transformer T.

Specifically, the second feedback control circuit 112 includes a second pre-conditioning circuit 1121, a second compensation circuit 1122, and a comparator 1123.

The second pre-conditioning circuit 1121 is configured to acquire the direct-current component and the current ripple signal of the transformer T, and the second compensation circuit 1122 and the comparator 1123 are configured to process these signals to acquire the secondary-side control signal in a pulse form.

The second compensation circuit 1122 includes a second operational amplifier A2, a fifth resistor R5, and a third capacitor C3, and the second pre-conditioning circuit 1121 includes an amplification circuit Acs, a sixth resistor R6, and a fourth capacitor C4.

The amplification circuit Acs is connected to one terminal of the sensing resistor Rcc, and the other terminal of the sensing resistor Rcc is grounded. Therefore, a voltage input fed into a first input terminal of the amplification circuit Acs may indicate the direct-current component of the output current signal. The other terminal of the amplification circuit Acs is grounded. An output terminal of the amplification circuit Acs is connected to one terminal of the sixth resistor R6. The other terminal of the sixth resistor R6 and one terminal of the fourth resistor R4 are both connected to a non-inverting input terminal of the second operational amplifier A2, and the other terminal of the fourth capacitor C4 is connected to the positive terminal of the output voltage.

It should be noted that the second pre-conditioning circuit 1121 may be constructed in other forms, which is not limited to the construction made by the amplification circuit Acs, the sixth resistor R6, and the fourth capacitor C4. However, the second pre-conditioning circuit 1121 may be constructed in any form as long as the second pre-conditioning circuit 1121 is capable of acquiring the direct-current component of the output current signal and the current ripple signal of the transformer T and inputting the signals to the second compensation circuit 1122. In addition, the second compensation circuit 1122 and the comparator 1123 may also be constructed in other forms, as long as the second compensation circuit 1122 and the comparator 1123 are capable of acquiring the secondary-side control signal in the pulse form based on the direct-current component of the output current signal and the current ripple signal of the transformer T.

An inverting input terminal of the second operational amplifier A2 is applied with a reference voltage Vr3. An output terminal of the second operational amplifier A2 is connected to a first input terminal (for example, an inverting input terminal) of the comparator 1123. The fifth resistor R5 and the third capacitor C3 are connected in series to form a branch. One terminal of the branch is connected to an output terminal of the second operational amplifier A2, and the other terminal of the branch is grounded. A second input terminal (for example, a non-inverting input terminal) of the comparator 1123 is applied with a reference voltage Vr4, and an output terminal of the comparator 1123 is connected to the secondary-side rectifier Q2 and the isolated transmission circuit 12.

In a constant current regulation mode, a voltage signal is acquired after the output current signal flows through the sensing resistor Rcc, and the voltage signal serves as the direct-current component of the output current signal. The amplification circuit Acs amplifies the direct-current component of the output current signal and provides an output having a predetermined magnification level. Under the forward effect formed by the sixth resistor R6 and the fourth capacitor C4, the direct-current component of the output current signal and the current ripple signal of the transformer T are acquired at a common node of the sixth resistor R6 and the fourth capacitor C4 and this direct-current component is fed into the non-inverting input terminal of the second operational amplifier A2.

The second operational amplifier A2, the fifth resistor R5, and the third capacitor C3 form a second-order compensation circuit structure. The third capacitor C3 serves as an integrator to reduce direct-current errors. The fifth resistor R5 is capable of amplifying an amplitude of the current ripple signal of the transformer T. The amplified amplitude help the comparator 1123 generate a digital signal. In addition, controlling the ripple may eliminate low-frequency pole formed by the output capacitor Co in the frequency response. Therefore, the frequency response is relatively quick, and the second-order compensation circuit structure may be designed in a high-frequency range.

In this way, the secondary-side control signal output by the comparator 1123 is capable of timely responding to the variations of the output current, and meanwhile, a control signal of each switching cycle is acquired from the secondary-side control signal based on the current ripple signal of the transformer T.

It may be understood that in order that the control circuit 10 is capable of operating in the constant voltage regulation mode and the constant current regulation mode, the feedback control circuit 11 simultaneously includes the first feedback control circuit 111, the second feedback control circuit 112, and a logic processing circuit 113. The logic processing circuit 113 includes a first input terminal, a second input terminal, and an output terminal. An output terminal of the first feedback control circuit 111 is connected to the first input terminal of the logic processing circuit 113. An output terminal of the second feedback control circuit 112 is connected to the second input terminal of the logic processing circuit 113. The output terminal of the logic processing circuit 113 is connected to the secondary-side rectifier Q2 and the isolated transmission circuit 12.

The logic processing circuit 113 may select a signal output by the first feedback control circuit 111 as the secondary-side control signal. Alternatively, the logic processing circuit 113 may select a signal output by the second feedback control circuit 112 as the secondary-side control signal. Furthermore, the logic processing circuit 113 may acquire the secondary-side control signal based on the combination of the signal output by the first feedback control circuit 111 and the signal output by the second feedback control circuit 112.

Figure 9:
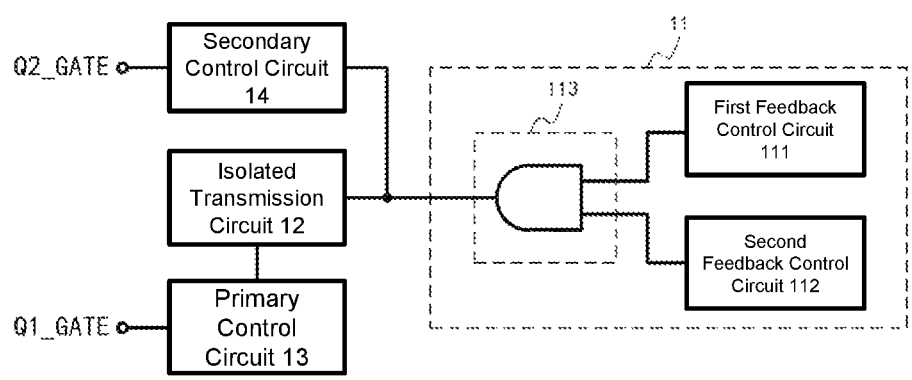
FIG. 9 is a schematic diagram of another feedback control circuit in FIG. 5.

In some embodiments, as illustrated in FIG. 9, the logic processing circuit 113 is an AND gate logic circuit.

Figure 10:
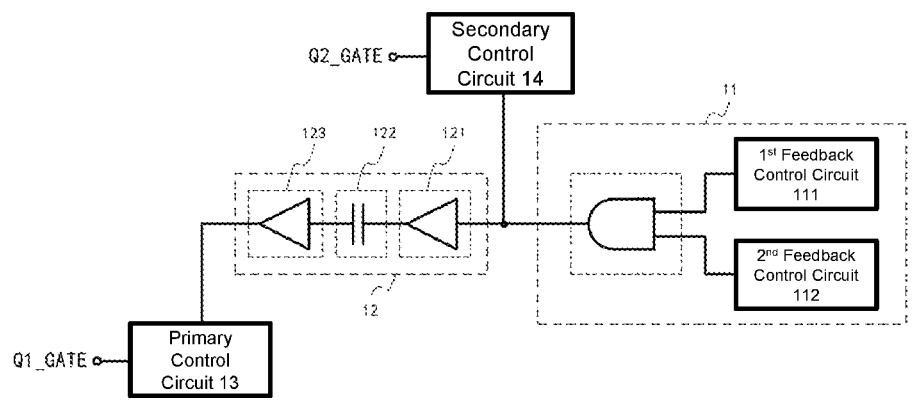
FIG. 10 is a schematic diagram of the isolated transmission circuit in FIG. 5.

The isolated transmission circuit 12 transmits the secondary-side control signal to the primary control circuit 13 in an isolation fashion. Specifically, as illustrated in FIG. 10, the isolated transmission circuit 12 includes a transmitter 121, an isolator 122, and a receiver 123.

The transmitter 121 includes an input terminal and an output terminal. The isolator 122 includes an input terminal and an output terminal, and the receiver 123 includes an input terminal and an output terminal.

The input terminal of the transmitter 121 is connected to the feedback control circuit 11. The output terminal of the transmitter 121 is connected to the input terminal of the isolator 122. The output terminal of the isolator 122 is connected to the input terminal of the receiver 123. The output terminal of the receiver 123 is connected to the primary control circuit 13.

The isolator 122 includes one capacitor or a plurality of capacitors. Alternatively, the isolator 122 may include one magnetic element or a plurality of magnetic elements. Furthermore, the isolator 122 may include one opto-coupler or a plurality of opto-couplers. As illustrated in FIG. 10, the isolator 122 includes a capacitor. One terminal of the capacitor is connected to the output terminal of the transmitter 121, and the other terminal of the capacitor is connected to the input terminal of the receiver 173.

To control the turn-on or turn-off of the primary-side switch Q1, the primary control circuit 13 is further configured to simultaneously receive the first primary-side control signal and the second primary-side control signal, and control the turn-on or turn-off of the primary-side switch Q1 based on the first primary-side control signal and the second primary-side control signal.

In some embodiments, the second primary-side control signal is generated based on a primary current detection signal indicative of a current flowing through the primary winding Np of the transformer T.

Figure 11:
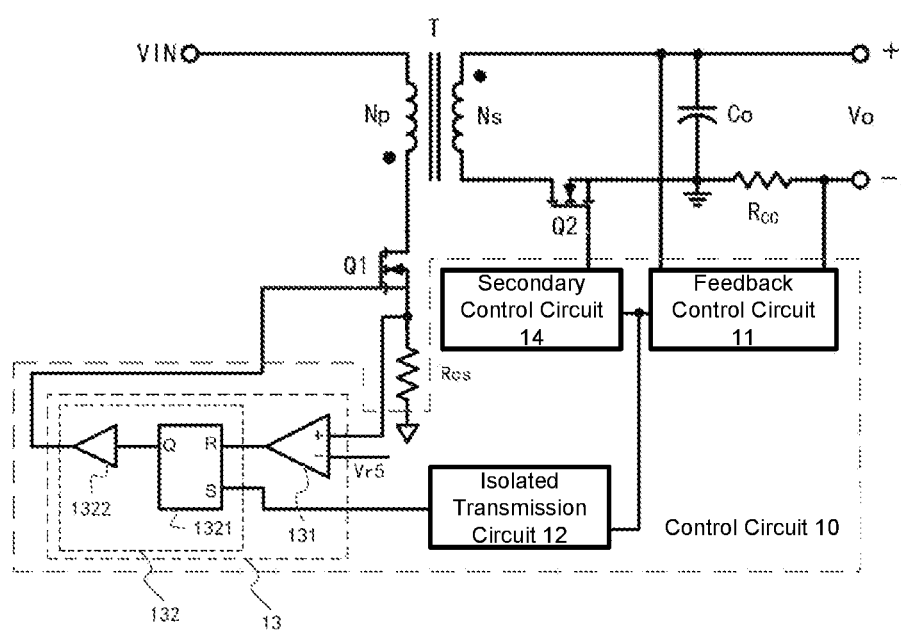
FIG. 11 is a schematic diagram of the primary control circuit in FIG. 5.

In the process of generating the second primary-side control signal, as illustrated in FIG. 11, the primary control circuit 13 includes a comparator 131. The comparator 131 includes a first input terminal, a second input terminal, and an output terminal.

The sensing resistor Rcs is configured to detect a current of the primary winding Np of the transformer T. A voltage indicative of the current can be acquired at one terminal of the sensing resistor Rcs. This voltage is taken as a primary current detection signal CS. The first input terminal (for example, a non-inverting input terminal) of the comparator 131 is connected to the one terminal of the sensing resistor Rcs configured to receive the primary current detection signal CS. The second input terminal (for example, an inverting input terminal) of the comparator 131 is applied with a reference voltage Vr5. The comparator 131 outputs the second primary-side control signal at the output terminal thereof based on a result of comparing the primary current detection signal CS with the reference voltage Vr5.

The primary control circuit 13 generates a primary-side drive signal based on the first primary-side control signal and the second primary-side control signal. The primary-side drive signal is used to control the turn-on or turn-off of the primary-side switch Q1. Specifically, the primary control circuit 13 includes a logic drive circuit 132. The logic drive circuit 132 includes a first input terminal, a second input terminal, and an output terminal.

The first primary-side control signal is fed into the first input terminal of the logic drive circuit 132. The second primary-side control signal is fed into the second input terminal of the logic drive circuit 132. The output terminal of the logic drive circuit 132 is connected to the primary-side switch Q1. The logic drive circuit 132 generates the primary-side drive signal based on the first primary-side control signal and the second primary-side control signal. The primary-side drive signal is used to control the turn-on or turn-off of the primary-side switch Q1. When the first input terminal of the logic drive circuit 132 receives the first primary-side control signal in the first modality (for example, the high level signal), the logic drive circuit 132 immediately turns on the primary-side switch Q1.

As illustrated in FIG. 11, the logic drive circuit 132 includes an RS trigger 1321. The RS trigger 1321 includes a set input terminal S, a reset input terminal R, and an output terminal Q.

Specifically, the set input terminal S of the RS trigger 1321 is the first input terminal of the logic drive circuit 132. The reset input terminal R of the RS trigger 1321 is the second input terminal of the logic drive circuit 132. The output terminal of the RS trigger 1321 is the output terminal of the logic drive circuit 132. It may be understood that the first primary-side control signal is fed into the set input terminal S of the RS trigger 1321, and the second primary-side control signal is fed into the reset input terminal R of the RS trigger 1321. The RS trigger 1321 performs logic operation on the first primary-side control signal and the second primary-side control signal and generates the primary-side drive signal such that the turn-on or turn-off of the primary-side switch Q1 is controlled.

It may be understood that the first primary-side control signal from the isolated transmission circuit 12 is intended to set the RS trigger 1321, such that the RS trigger 1321 outputs the primary-side drive signal capable of turning on the primary-side switch Q1. Since the first primary-side control signal is directly originated from the secondary-side control signal, the first primary-side control signal is equivalent to the secondary-side control signal which controls the turn-on or turn-off switching frequency of the primary-side switch Q1. In addition, the secondary-side control signal is immediately responsive to the output voltage or the output current of the secondary side, the primary side is capable of immediately responding to the variations of the output signal of the secondary side. This helps to improve the operating performance of the entire flyback circuit.

In addition, the second primary-side control signal fed into the reset input terminal R of the RS trigger 1321 may be any suitable input control signal. For example, the second primary-side control signal may be generated from the above primary current detection signal, which is intended for energy restriction to prevent the primary current flowing through the primary-side switch Q1 from being excessive to damage the primary-side switch Q1. When the primary current is excessive, the primary-side switch Q1 may be timely controlled to turn off by the signal. As a result of turning off the primary-side switch Q1, the primary-side switch Q1 is protected.

For ease of controlling the primary-side switch Q1, as illustrated in FIG. 11, the logic drive circuit 132 further includes a driver 1322. The driver 1322 includes an input terminal and an output terminal.

The input terminal of the driver 1322 is connected to the output terminal of the RS trigger 1321, and the output terminal of the driver 1322 is connected to the primary-side switch Q1. The driver 1322 is used to control the turn-on or turn-off of the primary-side switch Q1.

Figure 12:
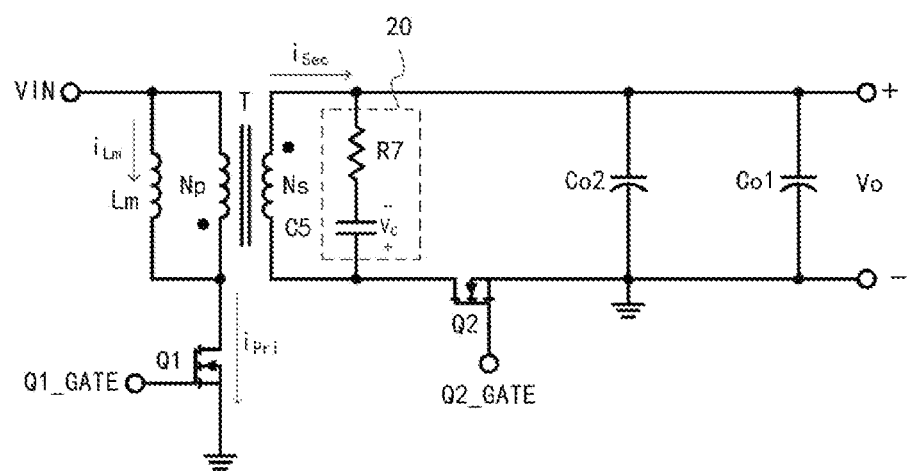
FIG. 12 is a schematic diagram of another flyback circuit according to an embodiment of the present disclosure.

In order that an entire magnetization induction current of the transformer T is used as ripple feedforward of the feedback control circuit 11, as illustrated in FIG. 12, the flyback circuit 100 further includes a ripple feedforward circuit 20. The ripple feedforward circuit 20 is connected in parallel between two terminals of the secondary winding Ns of the transformer T.

Specifically, the ripple feedforward circuit 20 includes a seventh resistor R7 and a fifth capacitor C5. One terminal of the seventh resistor R7 is connected to one terminal (for example, a dot terminal) of the secondary winding Ns of the transformer, and the other terminal of the seventh resistor R7 is connected to one terminal of the fifth capacitor C5. The other terminal of the fifth capacitor C5 is connected to the other terminal (for example, a non-dot terminal) of the secondary winding Ns of the transformer.

A product of the seventh resistor R7 and the fifth capacitor C5 satisfies $R*C=Lm/n$. R is the resistance of the seventh resistor R7. C is the capacitance of the fifth capacitor C5. Lm is the magnetization inductance of the primary winding Np, and n is a turn ratio of the primary winding Np to the secondary winding Ns.

Figure 13:
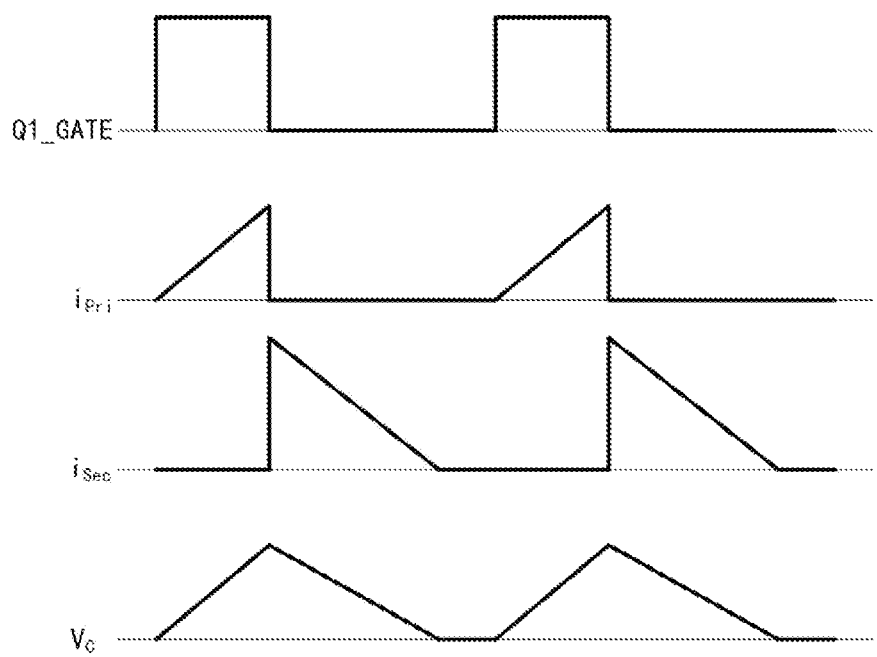
FIG. 13 illustrates various operating waveforms of a feedforward circuit in FIG. 12.

As illustrated in FIG. 13, a voltage Vc between two terminals of the fifth capacitor C5 follows variations of the magnetization induction current of the primary winding Np, such that the magnetization induction current of the primary winding Np is converted to a corresponding voltage that can be calculated.

In another aspect, the embodiments of the present disclosure provide a charger. The charger includes the flyback circuit 100 as described above. The charger is capable of processing the input power sources, and charging various electronic devices.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A control circuit configured to control a flyback circuit comprising a primary-side switch, a secondary-side rectifier and a transformer, the control circuit comprising:
   a feedback control circuit configured to generate a secondary-side control signal based on a current ripple signal of the transformer, and at least one of a direct-current component of an output voltage signal and a direct-current component of an output current signal of a secondary side of the flyback circuit, wherein the current ripple signal of the transformer is injected into the feedback control circuit through a low ac impedance capacitive path, and the secondary-side control signal is configured to control a turn-off of the secondary-side rectifier;

an isolated transmission circuit coupled to the feedback control circuit and configured to generate a first primary-side control signal based on the secondary-side control signal; and a primary control circuit coupled to the isolated transmission circuit and configured to control a turn-on of the primary-side switch in response to receiving the first primary-side control signal.

2. The control circuit of claim 1, wherein:
the primary control circuit is configured to receive the first primary-side control signal, and control the turn-on of the primary-side switch based on the first primary-side control signal.

3. The control circuit of claim 1, wherein:
the primary control circuit is configured to simultaneously receive the first primary-side control signal and a second primary-side control signal, and control the turn-on and a turn-off of the primary-side switch based on the first primary-side control signal and the second primary-side control signal.

4. The control circuit of claim 3, wherein:
the second primary-side control signal is generated based on a primary current detection signal indicative of a current flowing through a primary winding of the transformer.

5. The control circuit of claim 4, wherein:
the primary control circuit comprises a first comparator, and wherein:
 a first input terminal of the first comparator is configured to receive the primary current detection signal;
 a second input terminal of the first comparator is configured to be applied with a first reference voltage; and
 an output terminal of the first comparator is configured to generate the second primary-side control signal based on the primary current detection signal and the first reference voltage.

6. The control circuit of claim 4, wherein:
the primary control circuit comprises a logic drive circuit, and wherein:
 a first input terminal of the logic drive circuit is configured to receive the first primary-side control signal;
 a second input terminal of the logic drive circuit is configured to receive the second primary-side control signal; and
 an output terminal of the logic drive circuit is connected to the primary-side switch, and wherein the logic drive circuit is configured to generate a primary-side drive signal based on the first primary-side control signal and the second primary-side control signal, and the primary-side drive signal is used to control the primary-side switch.

7. The control circuit of claim 6, wherein:
the logic drive circuit comprises an RS trigger, and wherein:
 a set input terminal of the RS trigger is the first input terminal of the logic drive circuit;
 a reset input terminal of the RS trigger is the second input terminal of the logic drive circuit; and
 an output terminal of the RS trigger is the output terminal of the logic drive circuit.

8. The control circuit of claim 7, wherein:
the logic drive circuit further comprises a driver, and wherein:
 an input terminal of the driver is connected to the output terminal of the RS trigger; and an output terminal of the driver is connected to the primary-side switch.

9. The control circuit of claim 1, further comprising:
a secondary control circuit, wherein the secondary control circuit is connected to the feedback control circuit and the secondary-side rectifier, and wherein in response to receiving the secondary-side control signal in a first modality from the feedback control circuit, the secondary control circuit is configured to turn off the secondary-side rectifier.

10. The control circuit of claim 1, wherein:
the feedback control circuit comprises at least one of a first feedback control circuit and a second feedback control circuit, and wherein the secondary-side control signal is generated by the first feedback control circuit based on the direct-current component of the output voltage signal and the current ripple signal of the transformer, or generated by the second feedback control circuit based on the direct-current component of the output current signal and the current ripple signal of the transformer.

11. The control circuit of claim 10, wherein the first feedback control circuit comprises a first compensation circuit and a second comparator, and wherein:
 a first input terminal of the first compensation circuit is configured to receive the direct-current component of the output voltage signal and the current ripple signal of the transformer;
 a second input terminal of the first compensation circuit is configured to be applied with a second reference voltage;
 an output terminal of the first compensation circuit is connected to a first input terminal of the second comparator;
 a second input terminal of the second comparator is configured to be applied with a third reference voltage; and
 an output terminal of the second comparator is connected to the secondary-side rectifier and the isolated transmission circuit.

12. The control circuit of claim 11, wherein the first compensation circuit comprises a first operational amplifier, a first resistor, and a first capacitor, and wherein:
 a non-inverting input terminal of the first operational amplifier is the first input terminal of the first compensation circuit;
 an inverting input terminal of the first operational amplifier is the second input terminal of the first compensation circuit;
 an output terminal of the first operational amplifier is the output terminal of the first compensation circuit; and
 the first resistor is connected in series to the first capacitor to form a branch, wherein one terminal of the branch is connected to the output terminal of the first operational amplifier and the first input terminal of the second comparator, and an other terminal of the branch is grounded.

13. The control circuit of claim 12, wherein:
the first feedback control circuit further comprises a first pre-conditioning circuit, and wherein the first pre-conditioning circuit is configured to be connected to a positive terminal of an output voltage of the flyback circuit and the non-inverting input terminal of the first operational amplifier.

14. The control circuit of claim 13, wherein the first pre-conditioning circuit comprises a second resistor, a third resistor, a fourth resistor and a second capacitor, and wherein:
one terminal of the second resistor and one terminal of the second capacitor are both connected to the positive terminal of the output voltage;
an other terminal of the second capacitor and one terminal of the third resistor are both connected to the non-inverting input terminal of the first operational amplifier;
an other terminal of the third resistor, an other terminal of the second resistor, and one terminal of the fourth resistor are connected together; and
an other terminal of the fourth resistor is grounded.

15. The control circuit of claim 14, wherein the second feedback control circuit comprises a second compensation circuit and a third comparator, and wherein:
a first input terminal of the second compensation circuit is configured to receive the direct-current component of the output current signal and the current ripple signal of the transformer;
a second input terminal of the second compensation circuit is configured to be applied with a fourth reference voltage;
an output terminal of the second compensation circuit is connected to a first input terminal of the third comparator;
a second input terminal of the third comparator is configured to be applied with a fifth reference voltage; and
an output terminal of the third comparator is connected to the secondary-side rectifier and the isolated transmission circuit.

16. The control circuit of claim 15, wherein the second compensation circuit comprises a second operational amplifier, a fifth resistor and a third capacitor, and wherein:
a non-inverting input terminal of the second operational amplifier is the first input terminal of the second compensation circuit;
an inverting input terminal of the second operational amplifier is the second input terminal of the second compensation circuit;
an output terminal of the second operational amplifier is the output terminal of the second compensation circuit; and
the fifth resistor is connected in series to the third capacitor to form a branch, wherein one terminal of the branch is connected to the output terminal of the second operational amplifier and the first input terminal of the third comparator, and an other terminal of the branch is grounded.

17. The control circuit of claim 16, wherein:
the second feedback control circuit further comprises a second pre-conditioning circuit, and wherein the second pre-conditioning circuit is configured to be connected to the positive terminal of the output voltage of the flyback circuit and the non-inverting input terminal of the second operational amplifier.

18. The control circuit of claim 17, wherein the second pre-conditioning circuit comprises an amplification circuit, a sixth resistor, and a fourth capacitor, and wherein:
a first input terminal of the amplification circuit is configured to receive the direct-current component of the output current signal;
a second input terminal of the amplification circuit is grounded;
an output terminal of the amplification circuit is connected to one terminal of the sixth resistor;
an other terminal of the sixth resistor and one terminal of the fourth capacitor are connected to the non-Inverting input terminal of the second operational amplifier; and
an other terminal of the fourth capacitor is configured to be connected to the positive terminal of the output voltage of the flyback circuit.

19. The control circuit of claim 1, wherein the isolated transmission circuit comprises a transmitter, an isolator and a receiver, and wherein:
an input terminal of the transmitter is connected to the feedback control circuit;
an output terminal of the transmitter is connected to an input terminal of the isolator;
an output terminal of the isolator is connected to an input terminal of the receiver; and
an output terminal of the receiver is connected to the primary control circuit.

20. The control circuit of claim 19, wherein:
the isolator is selected from a group consisting of a capacitor, a magnetic element and an opto-coupler.

* * * * *